(12) United States Patent
Ishii

(10) Patent No.: US 7,322,012 B2
(45) Date of Patent: Jan. 22, 2008

(54) DISPLAY PROGRAM, DISPLAY METHOD AND DISPLAY DEVICE

(75) Inventor: Tomoyuki Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 489 days.

(21) Appl. No.: 10/098,463

(22) Filed: Mar. 18, 2002

(65) Prior Publication Data

US 2002/0180804 A1 Dec. 5, 2002

(30) Foreign Application Priority Data

May 29, 2001 (JP) .............................. 2001-161517

(51) Int. Cl.
*G06F 3/00* (2006.01)

(52) U.S. Cl. ..................... 715/811; 715/810

(58) Field of Classification Search ................ 715/811, 715/766, 810

See application file for complete search history.

(56) References Cited

U.S. PATENT DOCUMENTS

| | | | | |
|---|---|---|---|---|
| 5,125,071 A | * | 6/1992 | Ozeki | .......................... 715/811 |
| 5,420,975 A | * | 5/1995 | Blades et al. | ................ 715/811 |
| 5,666,502 A | * | 9/1997 | Capps | .......................... 715/811 |
| 6,828,992 B1 | * | 12/2004 | Freeman et al. | ............. 715/810 |
| 6,847,387 B2 | * | 1/2005 | Roth | .......................... 715/811 |

FOREIGN PATENT DOCUMENTS

| | | |
|---|---|---|
| JP | 62-49430 A | 3/1987 |
| JP | 9-292967 A | 11/1997 |
| JP | 10-232754 A | 9/1998 |
| JP | 2000-99231 A | 4/2000 |

* cited by examiner

*Primary Examiner*—Kieu Vu
*Assistant Examiner*—Dennis G. Bonshock
(74) *Attorney, Agent, or Firm*—Staas & Halsey LLP

(57) ABSTRACT

When the use frequencies of the commands or data pieces of the second group are not larger than those of the commands or data pieces of the first group as the result of sorting, displaying the commands or data pieces of the second group in the order of the use frequencies of the second group without changing the order of the commands or data pieces of the first group, commands or data pieces which are frequently used are displayed at the same display positions, thereby allowing easy retrieval and selection of a desired command or data piece depending on a user's memory.

32 Claims, 8 Drawing Sheets

(b-1) ORIGINAL DATA

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 0 | |

(b-2) DATA AFTER CHANGE IN USE FREQUENCY

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 750 | |

(b-3) DATA AFTER SORTING ACCORDING TO USE FREQUENCIES

| SET | COMMAND NAME | USE FREQUENCY | DISPLAY POSITION |
|---|---|---|---|
| B | COMMAND F | 750 | |
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |

(b-4) DATA AFTER EXCHANGE OF DISPLAY POSITIONS

| SET | COMMAND NAME | USE FREQUENCY | DISPLAY POSITION |
|---|---|---|---|
| A | COMMAND F | 750 | 5 |
| A | COMMAND A | 500 | 1 |
| A | COMMAND D | 300 | 2 |
| A | COMMAND C | 100 | 3 |
| A | COMMAND E | 50 | 4 |
| B | COMMAND B | 20 | |

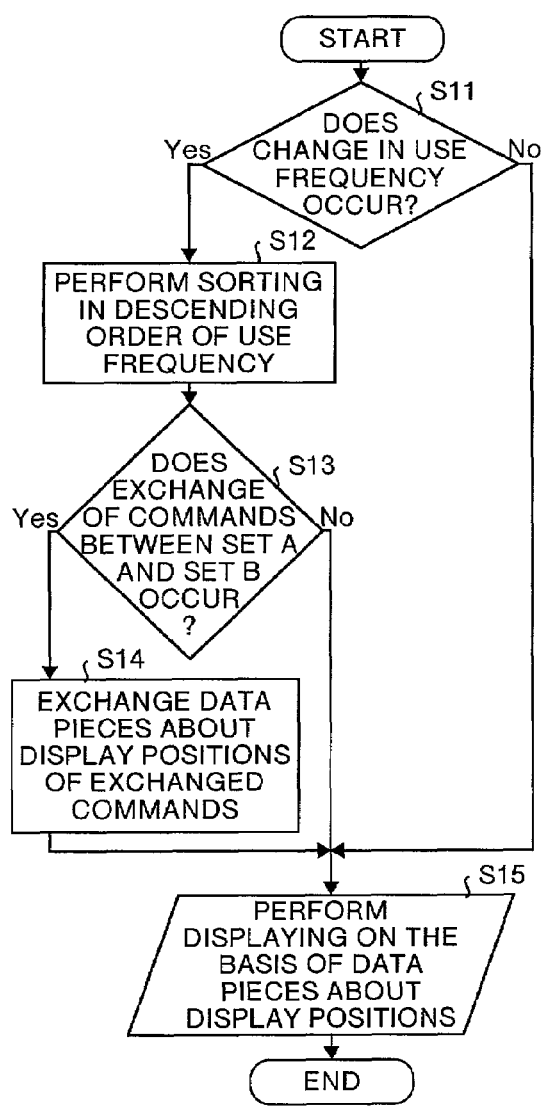

FIG. 3A

FIG. 3B (b-1) ORIGINAL DATA

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 0 | |

(b-2) DATA AFTER CHANGE IN USE FREQUENCY

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 750 | |

(b-3) DATA AFTER SORTING ACCORDING TO USE FREQUENCIES

| SET | COMMAND NAME | USE FREQUENCY | DISPLAY POSITION |
|---|---|---|---|
| B | COMMAND F | 750 | |
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |

(b-4) DATA AFTER EXCHANGE OF DISPLAY POSITIONS

| SET | COMMAND NAME | USE FREQUENCY | DISPLAY POSITION |
|---|---|---|---|
| A | COMMAND F | 750 | 5 |
| A | COMMAND A | 500 | 1 |
| A | COMMAND D | 300 | 2 |
| A | COMMAND C | 100 | 3 |
| A | COMMAND E | 50 | 4 |
| B | COMMAND B | 20 | |

FIG. 3C (c-1) ORIGINAL DATA

| • COMMAND A |
| • COMMAND D |
| • COMMAND C |
| • COMMAND E |
| • COMMAND B |

DISPLAY

BEFORE CHANGE IN USE FREQUENCY → AFTER CHANGE IN USE FREQUENCY (c-2) SORTING ACCORDING TO THIS INVENTION

| • COMMAND A |
| • COMMAND D |
| • COMMAND C |
| • COMMAND E |
| • COMMAND F |

(c-3) SORTING ACCORDING TO CONVENTIONAL ART

| • COMMAND F |
| • COMMAND A |
| • COMMAND D |
| • COMMAND C |
| • COMMAND E |

FIG.4A

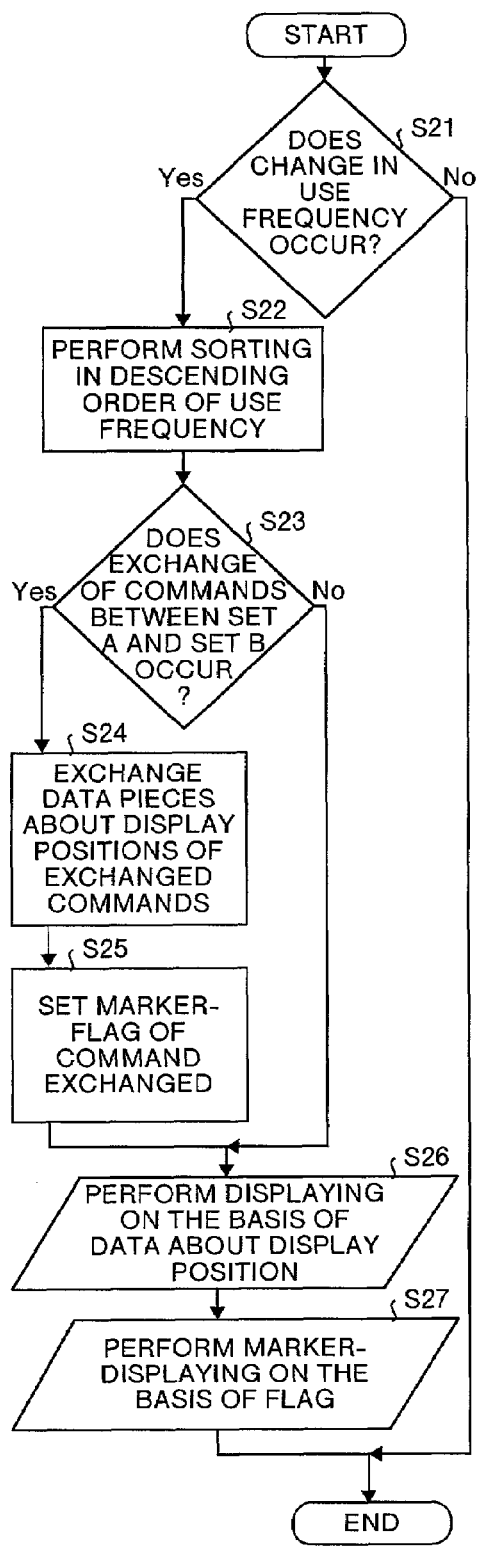

FIG.4B (b-1) ORIGINAL DATA

| SET | COMMAND NAME | USE FREQUENCY | DISPLAY POSITION | MAR-KER |
|---|---|---|---|---|
| A | COMMAND A | 500 | 1 | |
| A | COMMAND D | 300 | 2 | |
| A | COMMAND C | 100 | 3 | |
| A | COMMAND E | 50 | 4 | |
| A | COMMAND B | 20 | 5 | |
| B | COMMAND F | 0 | | |

(b-2) DATA AFTER CHANGE IN USE FREQUENCY

| SET | COMMAND NAME | USE FREQUENCY | DISPLAY POSITION | MAR-KER |
|---|---|---|---|---|
| A | COMMAND A | 500 | 1 | |
| A | COMMAND D | 300 | 2 | |
| A | COMMAND C | 100 | 3 | |
| A | COMMAND E | 50 | 4 | |
| A | COMMAND B | 20 | 5 | |
| B | COMMAND F | 750 | | |

(b-3) DATA AFTER SORTING ACCORDING TO USE FREQUENCIES

| SET | COMMAND NAME | USE FREQUENCY | DISPLAY POSITION | MAR-KER |
|---|---|---|---|---|
| B | COMMAND F | 750 | | |
| A | COMMAND A | 500 | 1 | |
| A | COMMAND D | 300 | 2 | |
| A | COMMAND C | 100 | 3 | |
| A | COMMAND E | 50 | 4 | |
| A | COMMAND B | 20 | 5 | |

(b-4) DATA AFTER EXCHANGE OF DISPLAY POSITIONS

| SET | COMMAND NAME | USE FREQUENCY | DISPLAY POSITION | MAR-KER |
|---|---|---|---|---|
| A | COMMAND F | 750 | 5 | |
| A | COMMAND A | 500 | 1 | |
| A | COMMAND D | 300 | 2 | |
| A | COMMAND C | 100 | 3 | |
| A | COMMAND E | 50 | 4 | |
| B | COMMAND B | 20 | | |

(b-5) DATA AFTER PROCESSING MARKER-FLAG

| SET | COMMAND NAME | USE FREQUENCY | DISPLAY POSITION | MAR-KER |
|---|---|---|---|---|
| A | COMMAND F | 750 | 5 | ↑ |
| A | COMMAND A | 500 | 1 | |
| A | COMMAND D | 300 | 2 | |
| A | COMMAND C | 100 | 3 | |
| A | COMMAND E | 50 | 4 | |
| B | COMMAND B | 20 | | |

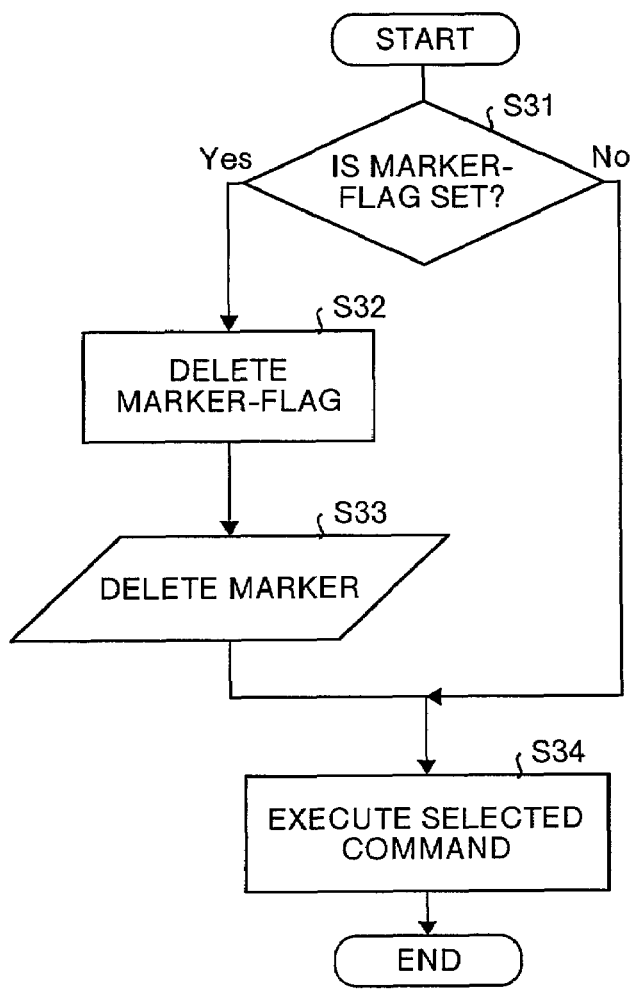

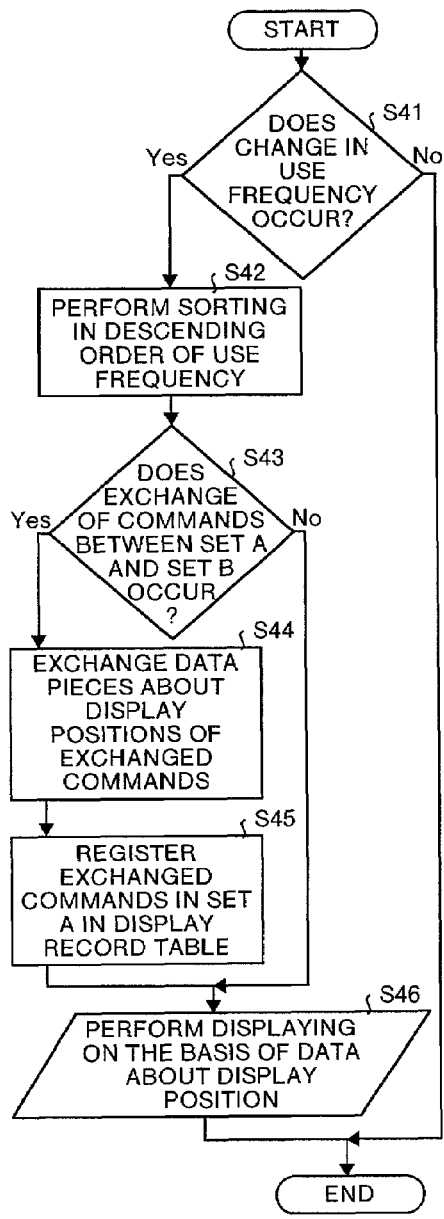

FIG.6A

FIG.6B (b-1) ORIGINAL DATA

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 0 | |

(b-2) DATA AFTER CHANGE IN USE FREQUENCY

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 750 | |

(b-3) DATA AFTER SORTING ACCORDING TO USE FREQUENCIES

| SET | COMMAND NAME | USE FREQUENCY | DISPLAY POSITION |
|---|---|---|---|
| B | COMMAND F | 750 | |
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |

(b-4) DATA AFTER EXCHANGE OF DISPLAY POSITIONS

| SET | COMMAND NAME | USE FREQUENCY | DISPLAY POSITION |
|---|---|---|---|
| A | COMMAND F | 750 | 5 |
| A | COMMAND A | 500 | 1 |
| A | COMMAND D | 300 | 2 |
| A | COMMAND C | 100 | 3 |
| A | COMMAND E | 50 | 4 |
| B | COMMAND B | 20 | |

(b-5) DISPLAY RECORD TABLE

| DISPLAY POSITION | BEFORE FIRST GENERATION | BEFORE SECOND GENERATION |
|---|---|---|
| 1 | COMMAND I | |
| 2 | COMMAND J | |
| 3 | COMMAND H | |
| 4 | COMMAND L | |
| 5 | COMMAND B | COMMAND G |

FIG.6C DISPLAY (c-1) ORIGINAL DATA

| • COMMAND A |
| • COMMAND D |
| • COMMAND C |
| • COMMAND E |
| • COMMAND B |

BEFORE CHANGE IN USE FREQUENCY → AFTER CHANGE IN USE FREQUENCY (c-2) SORTING ACCORDING TO THIS INVENTION

| • COMMAND A |
| • COMMAND D |
| • COMMAND C |
| • COMMAND E |
| • COMMAND F |

(c-3) COMMAND RECORD DISPLAY

| • COMMAND I |
| • COMMAND J |
| • COMMAND H |
| • COMMAND L |
| • COMMAND B |

FIG.7A

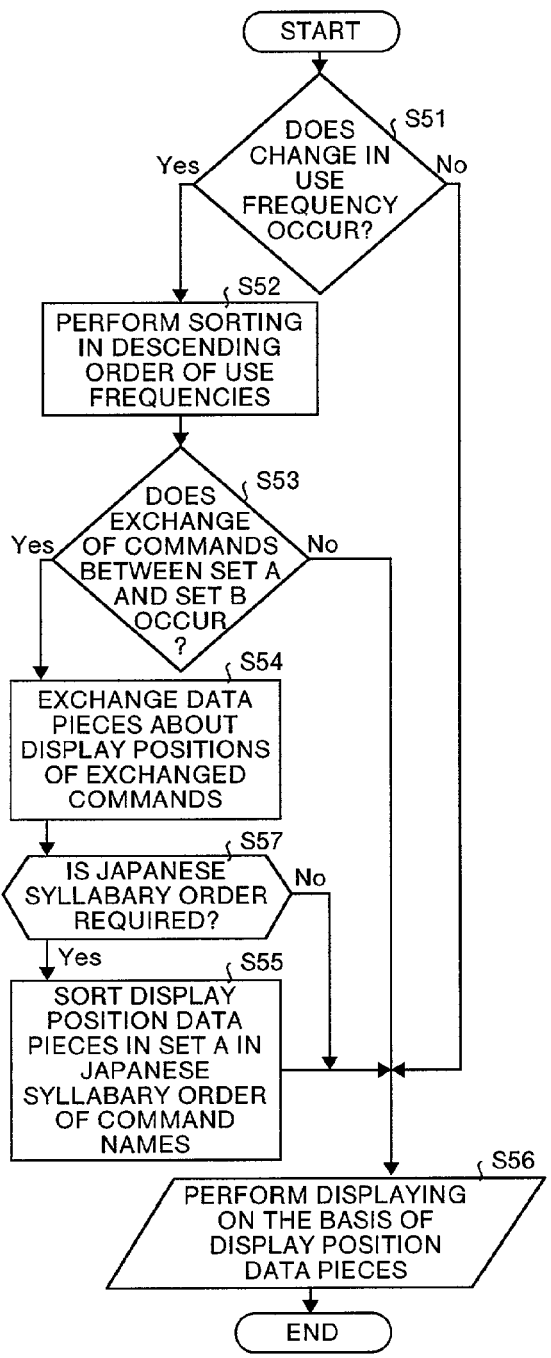

FIG.7B (b-1) ORIGINAL DATA

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 0 | |

(b-2) DATA AFTER CHANGE IN USE FREQUENCY

| SET | COMMAND NAME | USE FREQUENCY | DISPLAY POSITION |
|---|---|---|---|
| A | COMMAND A | 500 | 1 |
| A | COMMAND D | 300 | 2 |
| A | COMMAND C | 100 | 3 |
| A | COMMAND E | 50 | 4 |
| A | COMMAND B | 20 | 5 |
| B | COMMAND F | 750 | |

(b-3) DATA AFTER EXCHANGE OF DISPLAY POSITIONS

| SET | COMMAND NAME | USE FREQUENCY | DISPLAY POSITION |
|---|---|---|---|
| A | COMMAND F | 750 | 5 |
| A | COMMAND A | 500 | 1 |
| A | COMMAND D | 300 | 2 |
| A | COMMAND C | 100 | 3 |
| A | COMMAND E | 50 | 4 |
| B | COMMAND B | 20 | |

(b-4) DATA AFTER SORTING COMMANDS IN SET A IN JAPANESE SYLLABARY ORDER

| SET | COMMAND NAME | USE FREQUENCY | DISPLAY POSITION |
|---|---|---|---|
| A | COMMAND F | 750 | 5 |
| A | COMMAND A | 500 | 1 |
| A | COMMAND D | 300 | 2 |
| A | COMMAND C | 100 | 3 |
| A | COMMAND E | 50 | 4 |
| B | COMMAND B | 20 | |

FIG.7C (c-1) ORIGINAL DATA

| |
|---|
| • COMMAND A |
| • COMMAND D |
| • COMMAND C |
| • COMMAND E |
| • COMMAND B |

DISPLAY BEFORE CHANGE IN USE FREQUENCY → AFTER CHANGE IN USE FREQUENCY (c-2) SORTING ACCORDING TO THIS INVENTION

| |
|---|
| • COMMAND A |
| • COMMAND C |
| • COMMAND D |
| • COMMAND E |
| • COMMAND F |

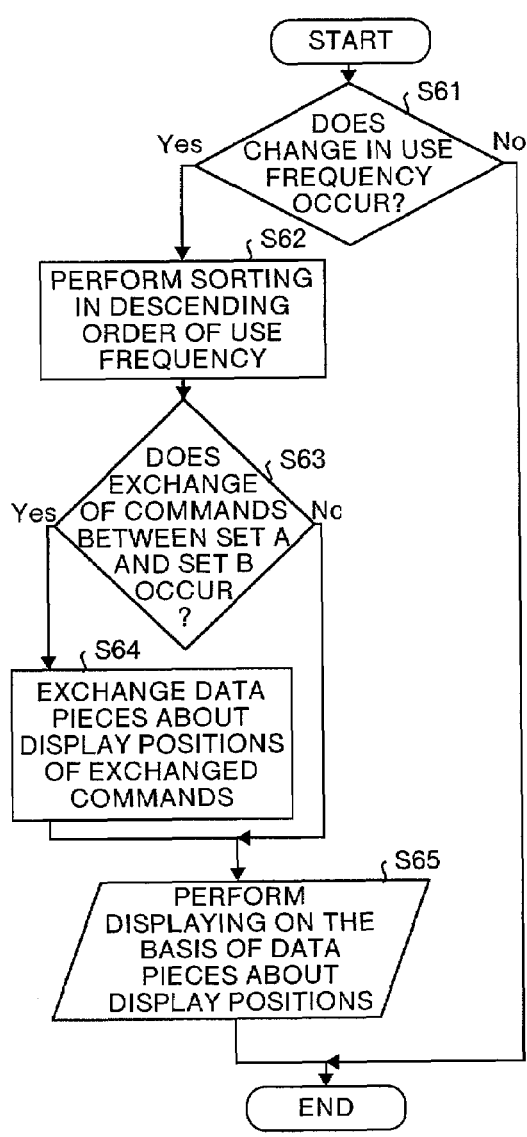

DISPLAY PROGRAM, DISPLAY METHOD AND DISPLAY DEVICE

FIELD OF THE INVENTION

The present invention relates to a display program, a display method and a display device which are suitable for displaying commands or data pieces in a predetermined order.

BACKGROUND OF THE INVENTION

Conventionally, when, from commands or data pieces, or data items, which have been displayed on a screen, for example, phone numbers or destination names, one is selected in order to call, such a processing is performed that the commands or the data pieces are sorted on the basis of the use frequencies of these commands or data pieces or their latest access times as they are is displayed in the order of the sorted result.

For this reason, when the sorted results obtained by sorting the commands or the data pieces on the basis of the use frequencies and the latest access times are displayed as they are, such a case occurs that respective display positions of many commands or data pieces are changed for each use of a command or a data piece. In such a case, when a user selects one of commands or data pieces to designate it, one must retrieve one's desired command or data piece from the stored display position. Therefore, there is a problem that the face that the display position has been changed for each use of command or data piece causes inconvenience in use.

Also, when respective display positions of the commands or datapieces are not changed at all on the basis of their use frequencies or latest access times and they are fixed, there is a problem that such a phenomenon may occur that a command or data piece having a high use frequency is displayed in a final entry or a command which has not been used for a long time period is displayed on a header entry so that convenience in use is not achieved.

SUMMARY OF THE INVENTION

The present invention has been achieved in order to solve the above problems. An object of the present invention lies in that commands or data pieces are divided into a first group including commands or data pieces which are used frequently and a second group including commands or data pieces which are not included in the first group, and when the commands or data pieces included in both the first and second groups are sorted to exchange a command or data piece included in the first group and a command or data piece included in the second group to each other in their orders, the command or data piece included in the second group is displayed at the position of the command or data pieces included in the first group or the command or data piece included in the second group is highlighted, so that a command or data piece which has a high use frequency is displayed at the same position, thereby allowing easy retrieval and selection of a desired command or data piece relied upon a user's memory.

With reference to FIG. 1, units which solve the above problems will be explained. In FIG. 1, a processing apparatus 1 is configured so as to divide commands or data pieces into a first group including commands or data pieces which are used frequently and a second group including commands or data pieces which are not included in the first group and sort the commands or data pieces included in the first and second groups together to exchange a command or data piece included in the first group with a command or data piece included in the second group and display it. Here, the processing apparatus comprises a sorting unit 2, a change detecting unit 3, a position replacing unit 4 and the like.

The sorting unit 2 is the unit which sorts commands or data pieces in use frequency, access frequency or Japanese syllabary (or alphabet) order.

The change detecting unit 3 is the unit which detects an exchange between a command or data piece of the first group and that of the second group which is performed as the result of sorting the commands or data pieces of the first group and the second group.

The position replacing unit 4 is the unit which, when the exchange of a command or data piece of the first group with a command or data piece of the second group in the order is detected, places the command or data piece of the second group in the position of the command or data piece of the first group in a replacing manner.

Next, an operation of the processing apparatus 1 will be explained. Commands or data pieces included in the first and second groups which are classified on the basis of the use frequencies or latest access times of the commands or data pieces are sorted by the sorting unit 2, and when non-exchange between a command or data piece of the first group and a command or data piece of the second group in the order is detected by the change detecting unit 3, the commands or data pieces of the first group are displayed in the previous displaying order, while, when an exchange of a command or data piece of the first group with a command or data piece of the second group in the order is detected by the change detecting unit 3, the command or data piece of the second group to be exchanged is placed and displayed at the display position of the command or data piece of the first group to be exchanged.

At this time, the command or data piece inserted from the first group to the second group is displayed in an enhancing manner.

Also, the record of commands or data pieces which were displayed for each display position of the commands or data pieces of the first group or for each generation of the commands or data piece are stored and the command or data pieces of the current generation is displayed at the display position corresponding to the displaying instruction of the previous generation.

Furthermore, the commands or data pieces of the first group are sorted according to the information indicated and they are displayed at the sorted display positions.

Accordingly, commands or data pieces are divided into a first group including commands or data pieces which are frequently used and a second group including commands or data pieces which are not included in the first group; when any command or data piece included in the first group is exchanged with a command included in the second group, the command included in the second group is placed and displayed at an original display position of the command or data piece included in the first group or it is displayed in an enhanced manner; so that the command or data piece which is used frequently is stored in the same display position, thereby allowing easy retrieval and selection of a desired command or data piece relied upon a user's memory.

Other objects and features of this invention will become understood from the following description with reference to the accompanying drawings.

BRIEF DESCRIPTION OF THE DRAWINGS

FIG. 3A is a flow diagram which shows an operation of a second embodiment of the present invention, FIG. 3B is a diagram which shows a data example of the second embodiment of the present invention, FIG. 3C is a diagram which shows a display example of the second embodiment of the present invention, FIG. 4A is a flowchart which shows an operation of a third embodiment of the present invention, FIG. 4B is a diagram which shows a data example of the third embodiment of the present invention, FIG. 5A is a flowchart which shows an operation of a fourth embodiment of the present invention, FIG. 5B is a diagram which shows a display example of the fourth embodiment of the present invention, FIG. 6A is a flowchart which shows an operation of a fifth embodiment of the present invention, FIG. 6B is a diagram which shows a data example of the fifth embodiment of the present invention, FIG. 6C is a diagram which shows a display example of the fifth embodiment of the present invention, FIG. 7A is a flowchart which shows an operation of a sixth embodiment of the present invention, FIG. 7B is a diagram which shows a data example of the sixth embodiment of the present invention, FIG. 7C is a diagram which shows a display example of the sixth embodiment of the present invention, FIG. 8A is a flowchart which shows an operation of a seventh embodiment of the present invention, FIG. 8B is a diagram which shows a data example of the seventh embodiment of the present invention, and FIG. 8C is a diagram which shows a display example of the seventh embodiment of the present invention.

DETAILED DESCRIPTIONS

Next, embodiments of the present invention and operations thereof will be explained in detail with reference to FIGS. 1 to 8.

Figure 1:
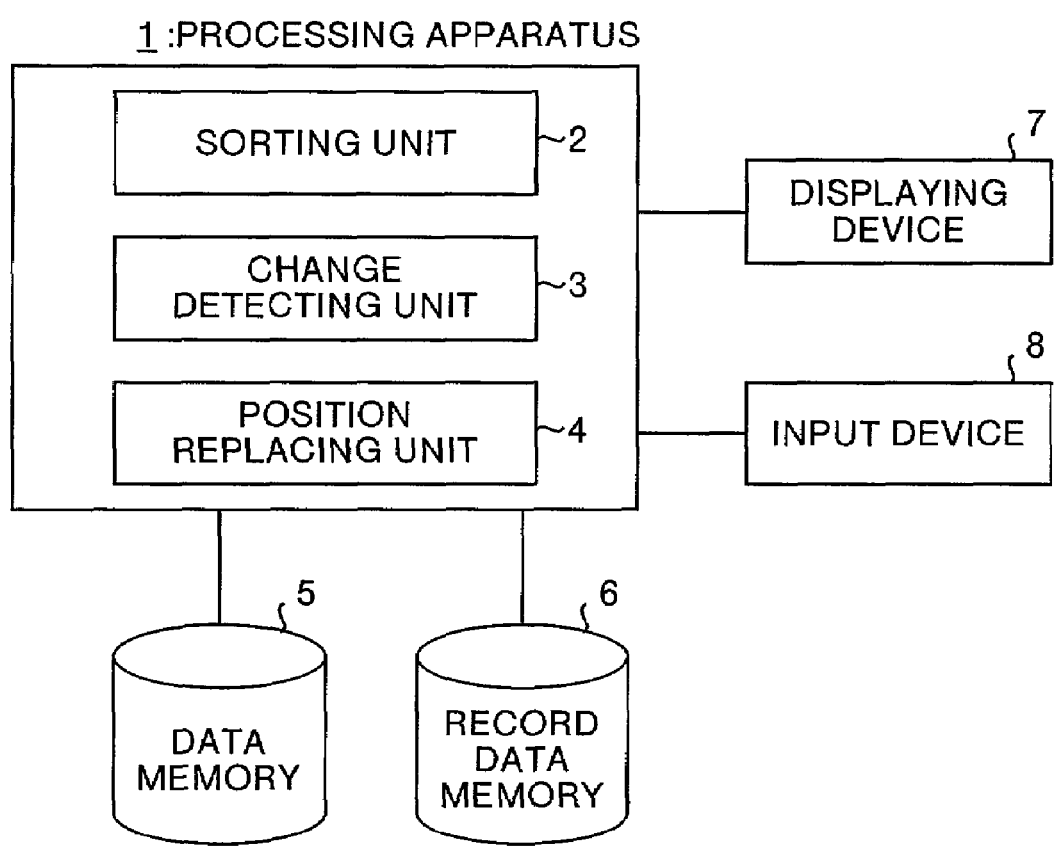
FIG. 1 is a block diagram which shows a configuration of a system of the present invention.

FIG. 1 shows a block diagram showing a system configuration of the present invention.

In FIG. 1, a processing apparatus 1 performs various processings according to a program, and it is configured with a sorting unit 2, a change detecting unit 3, a position replacing unit 4 and the like.

The sorting unit 2 is the unit which collectively sorts commands or data pieces of a first group including commands or data pieces which are frequently used and of a second group including commands or data pieces which are not used frequently, or are not included in the first group, in the order of a use frequency, an access time, an alphabet or the like.

The change detecting unit 3 is the unit which detects an exchange between a command or data piece of the first group and that of the second group which is performed as the result of sorting the commands or data pieces of the first group and the second group.

The position replacing unit 4 is the unit which, when the exchange of a command or data piece of the first group and a command or data piece of the second group in the order is detected, places the command or data piece of the second group in the original position of the command or data piece of the first group in a replacing manner to enter the command or data piece of the first group into the second group.

Data memory 5 is the memory which stores therein commands or data pieces to be displayed which have been classified into a first group including commands or data pieces which are frequently used and a second group including commands or data pieces together with their display positions or the like.

Record data memory 6 is the memory which stores display positions of commands or data pieces of the first group so as to correspond to generations thereof (refer to FIGS. 6A to 6C).

A displaying device 7 performs displaying of commands or data pieces, or the like in the order of the display positions.

An input device 8 inputs various data pieces or instructions into the processing apparatus.

Next, operation of the configuration shown in FIG. 1 will be sequentially explained in detail with reference to FIG. 2A to FIG. 8C.

Figures 2A, 2B, 2C:
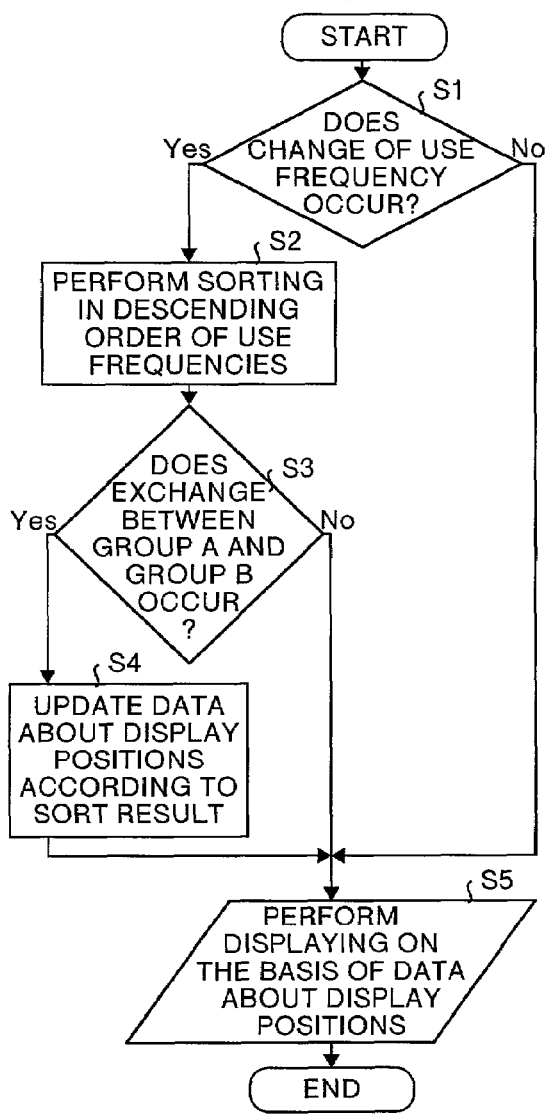
FIG. 2A is a flowchart which shows an operation of a first embodiment of the present invention.
FIG. 2B is a diagram which shows a data example of the first embodiment of the present invention.
FIG. 2C is a diagram which shows a display example of the first embodiment of the present invention.

FIGS. 2A to 2C shows diagrams for a first explanation (first embodiment) of the invention.

FIG. 2A is a flowchart which explains an operation of an embodiment, FIG. 2B is a diagram showing data examples, and FIG. 2C is a diagram showing display examples, respectively.

FIG. 2B shows data examples.

A table B-1 in FIG. 2B shows an example of original data. Here, a set A (first group) comprises commands A, D, C, E, and B, and a set B (second group) comprises F and the like. Use frequencies and display positions of the respective commands are stored in a left column and a right column.

A table B-2 in FIG. 2B shows an example of data obtained after some of their use frequencies have been changed. Here, the use frequencies of commands E and B have been changed from 50 and 20 times to 350 and 720 times.

A table B-3 in FIG. 2B shows an example of data obtained after sorting has been performed according to the use frequencies. This table is obtained by sorting the data pieces or commands, use frequencies of some of which have been changed in the table B-2 in FIG. 2B, according to their use frequencies to set the original orders of the respective commands shown in the table B-1 in FIG. 2B to the column for the display positions. That is, since any exchange of the orders of the commands in the set A and the set B according their use frequencies does not occur in the table B-2 in FIG. 2B (NO is judged at Step S3 in FIG. 2A), the display positions of the respective commands of the original data are set in the column for the display positions in the table B-3 shown in FIG. 2B so as to be same as the B-1 in FIG. 2B.

In FIG. 2A, at Step S1, whether or not there occurs any change in the use frequency is judged. This Step proceeds in such a manner that the setA (the first group) including the commands of the original data pieces (command) of the table B-2 shown in FIG. 2B which are frequently used and the like have been displayed on the display device 7, and whether or not any command or data piece has been selected and used is judged. Here, as shown in the table B-2 shown in FIG. 2B, it is assumed that the commands E and B have been used (for example, it is assumed that the use frequency of the command E has been changed from 50 times shown in the table B-1 in FIG. 2B to 350 times and that of the command B is changed from 20 times to 720 times). When the judgement at Step S1 is affirmative, the control proceeds to Step S2. When the judgement is negative, the control proceeds to Step S5.

At Step S2, since it is judged at Yes at Step S1 that a command or data piece has been used, the commands are sorted according to the descending order of the use frequencies. Here, this Step proceeds such that the commands in the table B-2 in FIG. 2B which have been changed due to the use are sorted according to the use frequencies as shown in the table B-3 shown in FIG. 2B.

At Step S3, whether or not any exchange or exchange of commands between the set A and the set B occurs is judged. This Step proceeds such that an exchange of any command in the set A and a command in set B occurs on the basis of the result obtained by sorting at Step S2. For example, in the table B-3 shown in FIG. 2B, the exchange of commands has been performed according to the use frequency, but there not any exchange among the commands between the set A and set B. When the judgement at Step S3 is affirmative, the control proceeds to Step S4. On the other hand, when the judgement is negative, the control skips Step S4 to proceed to Step S5 (in this case, for example, the original display positions of the respective commands shown in table B-1 shown in FIG. 2B (the displaying order) are shown in the column of the display positions in table B-3 shown in FIG. 2B).

At Step S4, since it has been judged at Step S4 that the exchange in the order of the commands between the set A and the set B occurs after sorting has been performed at Step S3, data about the display positions of the commands is updated according to the sort result. This Step proceeds such that, because the exchange in the display order of the commands in the set A and the commands in the set B has occurred, the display positions are updated after the commands have been sorted. Then, the control proceeds to Step S5.

At Step S5, displaying is performed on the basis of the data about the display positions. Thereby, for example, when the commands are displayed in the following order shown with a table C-1 in FIG. 2C:

command A
command D
command C
command E and
command B, since any exchange of commands in the set A and the set B has not occurred after sorting, the order of the commands is set to the following order shown in a table C-2 in FIG. 2C which is the same as the original order:

command A
command D
command C
command E and
command B, so that the same commands can be selected at the positions remembered by a user. On the other hand, when the order of the commands in the set A and the set B is changed by sorting after command use, the display positions are renumbered in the order of sorting and displayed.

On the other hand, conventionally, when the commands are always displayed in the order of the sort result obtained after command use, which is the following order shown in a table C-3 in FIG. 2C:

command B
command A
command E
command D and
command C, the order of the positions of the commands is changed for each change in use frequency, so that there occurs a drawback that the commands can not be found at the positions remembered by the user, thereby making it difficult to use the commands.

FIG. 2C shows a display example.

The table C-1 in FIG. 2C shows a display example of original data. This is obtained by performing displaying in the order of the display positions of the original data shown in the table B-1 in FIG. 2B described above as follows:

command A
command D
command C
command E and
command B.

A table C-2 in FIG. 2C shows a display example in a case of sorting according to the present invention (no change). This is obtained by performing displaying in the order of the display positions of the data after sorting is performed according to the use frequency in the table B-3 in FIG. 2B described above (the same order as the order of the original data shown in the table B-1 in FIG. 2B) as follows:

command A
command D
command C
command E and
command B.

The table C-3 in FIG. 2C shows a display example in a case of sorting according to the conventional art. In the case of sorting in this conventional art, since displaying is always performed in the order of the use frequency of the data after sorting is performed according to the use frequency shown in the table B-3 in FIG. 2B, displaying is performed as follows:

command B
command A
command E
command D and
command C.

In this conventional art, even though any exchange between the commands in the set A and the commands in the set B does not occur regarding the sort result obtained after command use, when a exchange of commands in the set A occurs, the commands are always displayed in the order of their use frequencies as they are, so that the display order of the commands in the set A is changed. Therefore, even when a user tries to select a command at the same position as remembered by the user, the command is moved to another position, which results in much inconvenience in use.

As mentioned above, when any exchange in the order of the commands in the set A and the commands in the set B does not occur, the display positions of the commands in the set A are maintained at their original positions, so that a user can easily select the command at the command position remembered by the user.

FIGS. 3A to 3B show diagrams for a second explanation (second embodiment) of the invention.

FIG. 3A is a flowchart which explains an operation of an embodiment, FIG. 3B is a diagram showing data examples, and FIG. 3C is a diagram showing a display example, respectively.

FIG. 3B shows data examples.

A table B-1 in FIG. 3B shows an example of original data. Here, a set A (first group) comprises commands A, D, C, E, and B, and a set B (second group) comprises F and the like. Use frequencies and display positions of the respective commands are stored in a left column and a right column.

A table B-2 in FIG. 3B shows an example of data after some of their use frequencies have been changed. Here, the use frequencies of command F have been changed from 50 times to 750 times.

A table B-3 in FIG. 3B shows an example of data after sorting has been performed according to the use frequency. This table is obtained by sorting the data pieces or commands, use frequencies of some of which have been changed as shown in the table B-3 in FIG. 3B, according to their use frequencies to set the original orders of the respective commands shown in the table B-1 in FIG. 3B to the column for the display positions.

A table B-4 in FIG. 3B shows an example of data after the display positions have been exchanged. This table is obtained by exchanging the command B in the set A and the command F in the set B from each other according to the use frequency shown in the table B-2 in FIG. 3B to position the command F and the command B to the fifth rank display positions, respectively (Refer to Step S14 according to YES at Step S12 in FIG. 3A).

In FIG. 3A, at Step S11, whether or not a change in use frequency occurs is judged. When the judgement is affirmative at this Step, the control proceeds to Step S12. When the judgement is negative, the control proceeds to Step S15.

At Step S12, the commands are sorted according the descending order of the use frequencies. The commands shown in the table B-2 in FIG. 3B are sorted according to their use frequencies as shown in the table B-3 in FIG. 3.

At Step S13, whether or not any exchange should be made between the set A and the set B is judged. The Step proceeds such that whether or not any exchange of a command in the set A and a command in the set B occurs is judged as the result of sorting at Step S12. In this embodiment, the use frequencies of the commands in the set A and the use frequencies of the commands in the set B are compared with each other and any command of the set B which has a use frequency higher than a use frequency of a command of the commands of the set A is exchanged with the command in the set A. For example, in the table B-3 of FIG. 3B, since the use frequency of the command B in the set A becomes the sixth rank and the use frequency of the command F in the set B is the first rank, the command A is placed in the set A and the command B is placed in the set B so that an exchange occurrence is judged. When the judgement is affirmative, the control proceeds to Step S14 on the basis of the judgement of the exchange occurrence. On the other hand, when the judgement is negative, the respective commands in the set A are set to their original display positions as the judgement of no exchange and the control proceeds to Step S15.

At Step S14, the information pieces about the display positions of the commands which have been subjected to exchange are exchanged with each other. Since the command B in the set A has become the sixth rank and the command F in the set B has become the first rank after sorting is performed according to the use frequencies of the commands shown in the table B-3 in FIG. 2B on the basis of YES at Step S13, exchange between the display position (the fifth rank) of the command B in the set A and the display position of the command F in the set B is performed and the display positions are set as shown in the table B-4 in FIG. 3B (The display positions first to fourth ranks are set in the same as the table B-1 in FIG. 3B and the fifth rank of the command B exchanged is set to the rank (=the fifth rank) of the command F. Then, the control proceeds to Step S15).

At Step S15, displaying is performed on the basis of the data about the display positions.

FIG. 3C shows a display example.

The table C-1 in FIG. 3C shows the display example of the original data pieces or commands. This is obtained by performing displaying in the order of the display positions of the original data shown in the table B-1 in FIG. 3B described above as follows:
command A
command D
command C
command E and
command B.

The table C-2 in FIG. 3C shows a display example in a case of sorting according to the present invention (exchange occurrence). This is obtained by displaying the table B-4 in FIG. 3B described above as follows:
command A
command D
command C
command E and
command F.

A table C-3 in FIG. 3C shows a display example in a case of sorting according to the conventional art. In the case of sorting in the conventional art, since the commands are always displayed in the ascending order of the use frequencies after sorting is performed according to the order in the column of use frequency shown in the table B-4 in FIG. 3B, they are displayed as follows:
command F
command A
command D
command C and
command E.

In this conventional art, when an exchange occurs among the commands in the set A and the commands in the set B in a mixed manner regarding the sort result obtained after command use, the commands are always displayed in the order of their use frequencies, so that the display order of the commands in the set A is changed. Therefore, even when a user tries to select a command at the same position as remembered by the user, the command is moved to another position, which results in much inconvenience in use.

As mentioned above, when any exchange between the set A and the set B in the order of the commands in the set A and the commands in the set B occur, the command in the set B is displayed at the position of the command in the set A to be exchanged with the command in the set B, so that the display positions of only the commands exchanged are changed and the other commands are maintained at their original positions. As a result, a user can easily select the command at the command position remembered by the user.

FIGS. 4A to 4B show diagrams for a third explanation (third embodiment) of the invention.

FIG. 4A is a flowchart which explains an operation of an embodiment and FIG. 4B is a diagram showing a data example. Here, Steps S21, S22, S23 and S24 are identical to Steps S11, S12, S13 and S14 in FIG. 3A, and explanation thereof will be omitted.

FIG. 4B shows an example of data items. Here, tables B-1 to B-4 in FIG. 4B are identical to the tables B-1 to B-4 in FIG. 3B, and explanation thereof will be omitted.

A table B-5 in FIG. 4B shows an example of data obtained after a marker flag has been processed. In this table, a flag "1" of a marker representing a new exchange in the set A is set to the command F moved from the set B to the set A (refer to Step S25 shown in FIG. 4A).

In FIG. 4A, at Step S25, a marker flag of the command F which has been exchanged is set. In this case, the flag "1" is set in a column for a marker of the command F which has been exchanged in the table B-5 in FIG. 4B.

At Step S26, the commands are displayed on the basis of the data in the display position column.

At Step S27, a marker is displayed on the basis of the flag. In these Steps S26 and S27, the commands A, D, C, E and F are displayed in this order on the basis of the data in a table B-5 in FIG. 4, as shown in a table B-2 in FIG. 5 described later, and the command F which has been moved from the set B to the set A in a replacing manner is marker-displayed (highlighting, or highlighting with thicker line or changed color), so that such a fact that exchange of a command for a command in the set B has first been displayed is intelligibly notified to a user.

FIGS. 5A and 5B show diagrams for a fourth explanation (fourth embodiment) of the present invention.

FIG. 5A shows a flowchart which explains an operation of this embodiment. This flowchart explains an operation performed when a command is selected.

In FIG. 5A, at Step S31, a judgement about a marker is made. At this step, when the commands are taken out in the order of the display positions of the data in the table B-5 in FIG. 4 and they are displayed, whether or not "1" has been set in the column of the marker flag of the command to be taken out and displayed is judged. When the judgement is affirmative, the control proceeds to Step S32. When the judgement is negative, the control proceeds to Step S34.

At Step S32, the marker flag is deleted. This Step is performed, for example, in order to highlight the command F until the command F is moved in the set A and is used and stopping the highlighting after the command F has been used.

At Step S33, the marker is deleted.

At Step S34, a command selected is executed. For example, a software corresponding to the command selected is actuated or such a processing as calling to data (telephone number) selected is performed.

FIG. 5B shows a display example.

A table B-1 in FIG. 5B shows a display example of original data. This is obtained by performing displaying in the order of the original data in the table B-1 in FIG. 4B as follows:
command A
command D
command C
command E and
command B.

A table B-2 in FIG. 5B shows a display example in a case of sorting according to the present invention (change occurrence). This is obtained by displaying the table B-5 in FIG. 4 described above as follows:
command A
command D
command C
command E and
*command F (highlighted with a thick letter).

As mentioned above, for example, the command F is highlighted (highlighted by using a thicker letter or a color-changed letter, or with a mark * attached at a header) until it is moved from the set B to the set A and it is first used, and the fact that there is a command (data) which has newly entered in the set A is notified to a user, so that the fact that a different command was previously displayed at the corresponding position can be notified to the user.

FIGS. 6A to 6C show diagrams for a fifth explanation (fifth embodiment) of the present invention.

FIG. 6A shows a flowchart which explains an operation of the embodiment, FIG. 6B shows data examples, and FIG. 6C shows display examples. Here, Steps S41, S42, S43, and S44 are identical to Steps S11, S12, S13, and S14 in FIG. 3A, and explanation thereof will be omitted.

FIG. 6B shows data examples. Here, tables B-1 to B-4 in FIG. 6B are identical to the tables B-1 to B4 in FIG. 3B and explanation thereof will be omitted.

The table B-5 in FIG. 6B shows an example of a display record table. This table is prepared by registering the respective commands in the A so as to cause their records which have been displayed in the past to correspond to generations sequentially. For example, since the command B at the display position 5 (the fifth rank) is exchanged with the command F in the set B, the command B is registered in the corresponding position as a record.

In FIG. 6A, at Step S45, a command of the set A which has been exchanged is registered in the display record table. As shown in a table B-5 in FIG. 6B described later, this Step is performed such that the command B at the fifth rank in the set A is exchanged with the command F in the set B to be moved in the set B, so that the record that the command B was previously displayed at the display position 5 (the fifth rank) in the set A is registered as shown with a mark (1).

At Step S46, the commands are displayed on the basis of the data about the display positions. At this step, the commands in the set A are displayed on the basis of the data about the display positions in the table B-4 in FIG. 6B, as shown in the table C-2 in FIG. 6C.

FIG. 6C shows a display example.

A table C-1 in FIG. 6C shows a display example of original data. This is obtained by performing displaying in the order of the display positions of the original data shown in the table B-1 in FIG. 6B described in the above as follows:
command A
command D
command C
command E and
command B.

A table C-2 in FIG. 6C shows a display example obtained in a case of sorting according to the present invention (change occurrence). This is obtained by displaying the table B-4 in FIG. 6 described above as follows:
command A
command D
command C
command E and
command F.

A table C-3 in FIG. 6C shows an example of a command record display. This table shows an example where commands displayed before one generation are displayed on the basis of the display record registered so as correspond to respective display positions of the commands in the set A in the table B-5 in FIG. 6B described previously. Thereby, it becomes possible to display the commands which were displayed before one generation.

FIGS. 7A to 7C show diagrams for a sixth explanation (sixth embodiment) of the present invention.

FIG. 7A shows a flowchart which explains an operation of the embodiment. Here, Steps S51, S52, S53, and S54 are identical to Steps S11, S12, S13 and S14 shown in FIG. 3A, and explanation thereof will be omitted.

In FIG. 7A, at Step S57, whether or not a user tries to sort the commands in the set A in the Japanese syllabary order is judged. When the judgement is affirmative, the control proceeds to Step S55. On the other hand, when the judgement is negative, the control proceeds to Step S56 without sorting the command in the Japanese syllabary order.

At Step S55, the commands in the set A or the data pieces about the display positions are sorted in the Japanese syllabary order of their command names. In the Step, for example, as shown in the table B-4 in FIG. 7B, after the command B in the set A and the command F in the set B are exchanged with each other, the commands are sorted in the Japanese syllabary order to set the display positions. Thereby, after exchanged, the commands in the set A are sorted in the Japanese syllabary order so that they can be displayed so as to allow easy searching thereof.

At Step S56, the commands are displayed on the basis of the data about the display positions. The commands in the set A are sorted in the Japanese syllabary order on the basis of the data about the display positions shown in the table B-4 in FIG. 7B, as shown in the table C-2 in FIG. 6C.

FIG. 7B shows data examples. Here, tables B-1, B-2 and B-3 are respectively identical to the tables B-1, B-2 and B-3 in FIG. 3B, and explanation thereof will be omitted.

A table B-4 in FIG. 7B shows an example of data obtained after the commands in the set A have been sorted in the Japanese syllabary order. This is obtained by sorting the commands of the set A after exchange to set the display positions sequentially.

FIG. 7C shows display examples.

A table C-1 in FIG. 7C shows a display example of original data. This is obtained by displaying the commands in the order of the display positions of the original data shown in the table B-1 in FIG. 7B described above as follows:
command A
command D
command C
command E and
command B.

A table C-2 in FIG. 7C shows a display example obtained in a case of sorting according to the present invention (sorting in Japanese syllabary order). This is obtained by displaying the table B-4 in FIG. 7B described above as follows:
command A
command C
command D
command E and
command F.

FIGS. 8A to 8C show diagrams for a seventh explanation (seventh embodiment) of the present invention. This is obtained by replacing an access time for the use frequency shown in FIGS. 3A to 3C.

FIG. 8A shows a flowchart which explains an operation of the embodiment, FIG. 8B shows data examples, and FIG. 8C shows display examples.

FIG. 8B shows the data examples.

A table B-1 in FIG. 8B shows original data. Here, a set A (a first group) comprises commands A, D, C, E and B, and a set B (a second group) comprises F and the like. Display positions according to access times are stored in a column as shown.

A table B-2 in FIG. 8B shows an example of data after access. Here, it is shown that a command F is accessed at 2000/1/9 9:00.

A table B-3 in FIG. 8B shows an example of data after sorted at an access time. This shows a state where sorting has been performed according to access times regarding the data after accessed in the table B-2 in FIG. 8B.

A table B-4 in FIG. 8B shows an example of data after exchanging display positions. This shows an example of data after a command A (the first rank) in a set A and a command F in a set B which have been exchanged with each other after sorting is performed according to access times as shown in the table B-3 in FIG. 8B.

In FIG. 8A, at Step S61, whether or not an access time has been changed is judged. When the judgement is affirmative, the control proceeds to Step S62. When the judgement is negative, the control or processing is terminated.

At Step S62, sorting is performed in the descending order of access times. At this step, regarding the table B-2 in FIG. 3B, sorting is performed according to access times as shown in a table B-3 in FIG. 8B.

At Step S63, whether or not exchange between the set A and the set B occurs is judged. This judges whether or not a command in the set A and a command in the set B are exchanged with each other as a result of sorting at Step S62. For example, in the table B-3 in FIG. 8B, since a command A in the set A has the sixth rank to enter in the set B while a command F in the set B has the first rank to enter in the set A, a judgement that an exchange has occurred is obtained at Step S63. When the judgement is affirmative, the control proceeds to Step S64 according to the judgement of exchange occurrence. On the other hand, when the judgement is negative, respective commands in the set A are set with their original display positions according to judgement of non-exchange and the control proceeds to Step S65.

At Step S64, exchange of data about the display positions of the commands which have been exchanged with each other is performed. For example, since the command A in the set A is applied with the sixth rank to enter in the set B and the command F in the set B is applied with the first rank to enter in the set A after sorting according to access times shown in the table B-3 in FIG. 8B on the basis of the judgement YES at Step S63, exchanging between the display position (the first rank) of the command A in the set A and the command F in the set B is performed, and the display positions are set as shown in the table B-4 in FIG. 8B (the second to fifth ranks of the display position are set in the same manner as the table B-1 in FIG. 8B, and the first rank of he command A exchanged is set as the rank (=the first rank) of the command F). Then, the control proceeds to Step S65.

At Step S65, displaying is performed on the basis of the data about the display positions. Thereby, for example, when displaying is performed in the order shown in a table C-1 in FIG. 8C as follows:
command A
command D
command C
command E and
command B, since exchanging commands in the set A and the set B has been performed as the sort result after command use, only the following order shown in a table C-2 in FIG. 8C and a leading are exchanged and the other is set to the same as the original, so that the same commands can rapidly be selected at their positions remembered by a user.

command F
command D
command C
command E and
command B.

On the other hand, when exchange of the order of the commands in the set A and the set B does not occur by sorting after command use, the original display positions are maintained.

On the other hand, conventionally, when displaying is always performed in the order shown in a table C-3 in FIG. 8C on the basis of the sort result after command use as follows:

command F
command D
command B
command D and
command E, the order of the command positions is changed for each change of access time, which results in inconvenience in use due to that commands are not maintained at their positions remembered by a user.

FIG. 8C shows a display example.

A table C-1 in FIG. 8C shows a display example of original data. This is obtained by performing displaying in the order of the display positions of the original data shown in the table B-1 in FIG. 8B as follows:

command A
command D
command C
command E and
command B.

A table C-2 in FIG. 8C shows a display example in a case of sorting according to the present invention (change occurrence). This is obtained by displaying the table B-4 in FIG. 8B described above as follows:

command F
command D
command C
command E and
command B.

A table C-3 in FIG. 8C shows a display example in a case of sorting according to the conventional art. In the case of this conventional art, since displaying is always performed in the order of the data after sorting according to the access times shown in the table B-3 in FIG. 8B, displaying is performed as follows:

command F
command C
command B
command D and
command E.

In this conventional art, regarding the sort result after command access, since the commands in the set A and the commands in the set B are sorted in a mixing manner, and they are always displayed in the order of access times, the display order of the commands in the set A is changed for each access, so that, even if a user tries to select a command at the same position as remembered by him/her, the command is moved to another position, which results in much inconvenience in use.

As explained above, according to the present invention, such a configuration is employed that commands or data pieces are divided into a first group including commands or data pieces which are frequently used and a second group including commands or data pieces which are other than the commands or data pieces included in the first group and, when the commands or data pieces included in the first and second group are sorted in a mixing manner and the order of any commands in the set A and the set B is changed, a command in the set B is placed at the corresponding display position of the exchanged command in the set A or it is highlighted, it becomes possible to places the commands or data pieces which are frequently used in the same display positions thereby allowing easy retrieval and selection of a desired command or data piece depending on a user's memory.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium on which a display program for displaying commands or data pieces in a display screen in a predetermined order to cause a computer to function as units, wherein
   a unit which collects and stores frequencies of use of the commands or data pieces, the commands or data pieces being classified in a first group to be displayed in the display screen including commands or data pieces having high frequencies of use and a second group including commands or data pieces having frequencies of use lower than those of the first group;
   a unit which sorts said commands or data pieces in the first group and the second group in a mixing manner according to the frequencies of use stored; and
   a unit which, when the frequency of use of any command or data piece of the second group is larger than that of any command or data piece of said commands or data pieces of the first group as the result of sorting, replaces the command or data piece in the lowest order within the first group with the command or data piece of the second group having larger frequency of use than any command or data piece of the first group without changing the display order of other commands or data pieces of the first group, wherein
   the command or data piece in the second group that replaces the command or data piece in the lowest order within the first group is displayed at a display position in the lowest order instead of the command or data piece in the lowest order within the first group.

2. The computer-readable recording medium on which a display program has been recorded according to claim 1, wherein the displaying unit, when the frequencies of use of said commands or data pieces of the second group are not larger than those of said commands or data pieces of the first group as the result of sorting, displays said commands or data pieces of the first group without changing the order of said commands or data pieces of the first group.

3. The computer-readable recording medium on which a display program has been recorded according to claim 2, wherein the computer is caused to function as a unit which stores a record of a command or data piece which was displayed in the past for each of the display positions of said commands or data pieces of the first group or for each of generations, and displays the command or data piece of a previous generation at the display position so as to correspond to a display instruction of the previous generation.

4. The computer-readable recording medium on which a display program has been recorded according to claim 3, wherein the computer is caused to function as a unit which sorts said commands or data pieces of the first group according to instructed information to display them according to the sorted display positions.

5. The computer-readable recording medium on which a display program has been recorded according to claim 2, wherein the computer is caused to function as a unit which highlights a command or data piece entered in said first group from said second group and displayed.

6. The computer-readable recording medium on which a display program has been recorded according to claim 5, wherein the computer is caused to function as a unit which stores a record of a command or data piece which was displayed in the past for each of the display positions of said commands or data pieces of the first group or for each of generations, and displays the command or data piece of a previous generation at the display position so as to correspond to a display instruction of the previous generation.

7. The computer-readable recording medium on which a display program has been recorded according to claim 6, wherein the computer is caused to function as a unit which sorts said commands or data pieces of the first group according to instructed information to display them according to the sorted display positions.

8. A display method which displays commands or data pieces in a display screen in a predetermined order, comprising:
   collecting and storing frequencies of use of the commands or data pieces, the commands or data pieces being classified in a first group to be displayed in the display screen including commands or data pieces having high frequencies of use and a second group including commands or data pieces having frequencies of use lower than those of the first group and displayed;
   sorting said commands or data pieces in the first group and the second group in a mixing manner according to the frequencies of use stored; and
   when the frequency of use of any command or data piece of the second group is larger than that of any command or data piece of said commands or data pieces of the first group as the result of sorting, replacing the command or data piece in the lowest order within the first group with the command or data piece of the second group having larger frequency of use than any command or data piece of the first group without changing the display order of other commands or data pieces of the first group, and displaying the command or data piece in the second group that replaces the command or data piece in the lowest order within the first group at a display position in the lowest order instead of the command or data piece in the lowest order within the first group.

9. The display method according to claim 8, wherein the displaying further includes, when the frequencies of use of said commands or data pieces of the second group are not larger than those of said commands or data pieces of the first group as the result of sorting, displaying said commands or data pieces of the first group without changing the order of said commands or data pieces of the first group.

10. The display method according to claim 9, further comprising the step of storing a record of a command or data piece which was displayed in the past for each of the display positions of said commands or data pieces of the first group or for each of generations, and displaying the command or data piece of a previous generation at the display position so as to correspond to a display instruction of the previous generation.

11. The display method according to claim 10, further comprising sorting said commands or data pieces of the first group according to instructed information to display them according to the sorted display positions.

12. The display method according to claim 9, further comprising the step of highlighting a command or data piece entered in said first group from said second group and displayed.

13. The display method according to claim 12, further comprising the step of storing a record of a command or data piece which was displayed in the past for each of the display positions of said commands or data pieces of the first group or for each of generations, and displaying the command or data piece of a previous generation at the display position so as to correspond to a display instruction of the previous generation.

14. The display method according to claim 13, further comprising the step of sorting said commands or data pieces of the first group according to instructed information to display them according to the sorted display positions.

15. A display apparatus which displays commands or data pieces in a display screen in a predetermined order comprising:
   a unit which collects and stores use frequencies of use of the commands or data pieces, the commands or data pieces being classified in a first group to be displayed in the display screen including commands or data pieces having high use frequencies of use and a second group including commands or data pieces having frequencies of use lower than those of the first group;
   a unit which sorts said commands or data pieces in the first group and the second group in a mixing manner according to the frequencies of use stored; and
   a unit which, when the frequency of use of any command or data piece of the second group is larger than that of any command or data piece of the first group as the result of sorting, replaces the command or data piece in the lowest order within the first group with the command or data piece of the second group having larger frequency of use than any command or data piece of the first group without changing the display order of other commands or data pieces of the first group, wherein
   the command or data piece in the second group that replaces the command or data piece in the lowest order within the first group is displayed at a display position in the lowest order instead of the command or data piece in the lowest order within the first group.

16. The display apparatus according to claim 15, wherein the displaying unit, when the frequencies of use of said commands or data pieces of the second group are not larger than those of said commands or data pieces of the first group as the result of sorting, displays said commands or data pieces of the first group without changing the order of said commands or data pieces of the first group.

17. The display apparatus according to claim 16, further comprising a unit which stores a record of a command or data piece which was displayed in the past for each of the display positions of said commands or data pieces of the first group or for each of generations, and displays the command or data piece of a previous generation at the display position so as to correspond to a display instruction of the previous generation.

18. The display apparatus according to claim 17, further comprising a unit which sorts said commands or data pieces of the first group according to instructed information to display them according to the sorted display positions.

19. The display apparatus according to claim 16, further comprising a unit which highlights a command or data piece entered in said first group from said second group and displayed.

20. The display apparatus according to claim 19, further comprising a unit which stores a record of a command or data piece which was displayed in the past for each of the display positions of said commands or data pieces of the first group or for each of generations, and displays the command or data piece of a previous generation at the display position so as to correspond to a display instruction of the previous generation.

21. The display apparatus according to claim 20, further comprising a unit which sorts said commands or data pieces of the first group according to instructed information to display them according to the sorted display positions.

22. A computer-readable recording medium storing a display program causing a computer to function as units for displaying commands or data pieces in a display screen in a predetermined order, the program comprising:
   a unit which collects and stores access times of commands or data pieces, the commands or data pieces being classified into a first group to be displayed in the display screen including commands or data pieces having new access times and a second group including commands or data pieces having access times older than the commands or data pieces of the first group;
   a unit which sorts said commands or data pieces of the first group and the second group in a mixing manner according to the stored access times; and
   a unit which, when the access time of any command or data piece of said commands or data pieces of said second group is newer than that of any command or data piece of said commands or data pieces of the first group as the result of sorting, replaces the command or data piece in the lowest order within the first group with the command or piece of the second data group having newer access time than any command or data piece of the first group without changing the display order of the commands or data pieces of the first group, wherein
   the command or data piece in the second group that replaces the command or data piece in the lowest order within the first group is displayed at a display position in the lowest order instead of the command or data piece in the lowest order within the first group.

23. The computer-readable storage medium according to claim 22, wherein the displaying unit, when the access times of said commands or data pieces of the second group are not newer than those of said commands or a pieces of the first group as the result of sorting, displays said commands or data pieces of the first group without changing the order of said commands or data pieces of the first group.

24. The computer-readable storage medium according to claim 23, wherein the computer is caused to function as a unit which stores a record of a command or data piece which was displayed in the past for each of the display positions of said commands or data pieces of the first group or for each of generations, and displays the command or data piece of a previous generation at the display position so as to correspond to a display instruction of the previous generation.

25. The computer-readable storage medium according to claim 24, wherein the computer is caused to function as a unit which sorts said commands or data pieces of the first group according to instructed information to display them according to the sorted display positions.

26. The computer-readable storage medium according to claim 23, wherein the computer is caused to function as a unit which highlights a command or data piece entered in said first group from said second group and displayed.

27. The computer-readable storage medium according to claim 26, wherein the computer is caused to function as a unit which stores a record of a command or data piece which was displayed in the past for each of the display positions of said commands or data pieces of the first group or for each of generations, and displays the command or data piece of a previous generation at the display position so as to correspond to a display instruction of the previous generation.

28. The computer-readable storage medium display program according to claim 27, wherein the computer is caused to function as a unit which sorts said commands or data pieces of the first group according to instructed information to display them according to the sorted display positions.

29. A computer-readable recording medium on which a display program for displaying commands or data pieces in a display screen in a predetermined order to cause a computer to function as units, wherein
   a unit which collects and stores frequencies of use of the commands or data pieces, the commands or data pieces being classified in a first group to be displayed in the display screen including commands or data pieces having high frequencies in use and a second group including commands or data pieces having frequencies of use lower than those of the first group;
   a unit which sorts said commands or data pieces in the first group and the second group in a mixing manner according to the frequencies of use stored; and
   a unit which displays the command or data piece in the first group and the command or data piece of the second group having larger frequency of use than any command or data piece of the first group in the display screen concurrently without changing the display order of other commands or data pieces of the first group, such that the command or data piece in the second group having larger frequency of use than any command or data piece of the first group is displayed at a display position in the lowest order instead of the command or data piece in the lowest order within the first group, when the frequency of use of any command or data piece of the second group is larger than that of any command or data piece of the first group as the result of sorting, and which displays said commands or data pieces of the first group without changing the predetermined order, when the frequencies of use of said commands or data pieces of the second group are not larger than those of said commands or data pieces of the first group as the result of sorting.

30. A display method which displays commands or data pieces in a display screen in a predetermined order, comprising:
   collecting and storing frequencies of use of the commands or data pieces, the commands or data pieces being classified in a first group to be displayed in the display screen including commands or data pieces with high frequencies of use and a second group including commands or data pieces with frequencies of use lower than those of the first group;
   sorting said commands or data pieces in the first group and the second group in a mixing manner according to the frequencies of use stored; and displaying the command or data piece in the first group and the command or data piece of the second group having larger frequency of use than any command or data piece of the first group in the display screen concurrently without changing the display order of other commands or data pieces of the first group, such that the command or data piece in the second group that replaces the command or data piece in the lowest order within the first group is displayed at a display position in the lowest order instead of the command or data piece in the lowest order within the first group, when the frequency of use of any command or data piece of the second group is larger than that of any command or data piece of the first group as the result of sorting, and displaying said commands or data pieces of the first group without changing the predetermined order, when the frequencies of use of said commands or data pieces of the second group are not larger than those of said commands or data pieces of the first group as the result of sorting.

31. A display apparatus which displays commands or data pieces in a display screen in a predetermined order comprising:

a unit which collects and stores frequencies of use of the commands or data pieces, the commands or data pieces being classified in a first group to be displayed in the display screen including commands or data pieces with high frequencies of use and a second group including commands or data pieces with frequencies of use lower than those of the first group;

a unit which sorts said commands or data pieces in the first group and the second group in a mixing manner according to the frequencies of use stored; and a unit which displays the command or data piece in the first group and the command or data piece of the second group having larger frequency of use than any command or data piece of the first group in the display screen concurrently without changing the display order of other commands or data pieces of the of the first group, such that the command or data piece in the second group having larger frequency of use than any command or data piece in the first group is displayed at a display position in the lowest order instead of the command or data piece in the lowest order within the first group, when the frequency of use of any command or data piece of the second group is larger than that of any command or data piece of the first group as the result of sorting, and which displays said commands or data pieces of the first group without changing the predetermined order, when the frequencies of use of said commands or data pieces of the second group are not larger than those of said commands or data pieces of the first group as the result of sorting.

32. A display method which displays commands or data pieces in a display screen in a predetermined order, comprising:

collecting and storing frequencies of use of the commands or data pieces, the commands or data pieces being classified in a first group to be displayed in the display screen including commands or data pieces with higher frequencies of use and a second group including commands or data pieces with frequencies of use lower than those of the first group;

sorting the commands or data pieces between the first group and the second group according to the frequencies of use, the commands or data pieces being sorted such that if the frequencies of use change and cause a command or data piece of the second group to have a greater frequency of use than a command or data piece of the first group, then an exchange is performed between the first and second groups to maintain the first group as having greater frequencies of use, the exchange dividing the commands or data pieces of the first group into a remaining set of commands or data pieces and an added set having at least one command or data piece added from the second group; and displaying the remaining set of commands or data pieces of the first group without changing the predetermined order even if the frequencies of use of the remaining set changed to cause the predetermined order to be an order different from a frequency of use order, wherein the added set having at least one command or data piece added from the second group is displayed at a lower display position than the remaining set of commands or data pieces of the first group.

* * * * *

UNITED STATES PATENT AND TRADEMARK OFFICE
CERTIFICATE OF CORRECTION

| | |
|---|---|
| PATENT NO. | : 7,322,012 B2 |
| APPLICATION NO. | : 10/098463 |
| DATED | : January 22, 2008 |
| INVENTOR(S) | : Tomoyuki Ishii |

It is certified that error appears in the above-identified patent and that said Letters Patent is hereby corrected as shown below:

Column 18, Line 16-17, after "medium" delete "display program".

Column 19, Line 39, after "of the" delete "of the". (Second Occurrence).

Signed and Sealed this

Nineteenth Day of August, 2008

JON W. DUDAS
*Director of the United States Patent and Trademark Office*